Oct. 17, 1933.                W. C. BUTTNER                1,930,461
                                  FAUCET
                            Filed Oct. 6, 1932
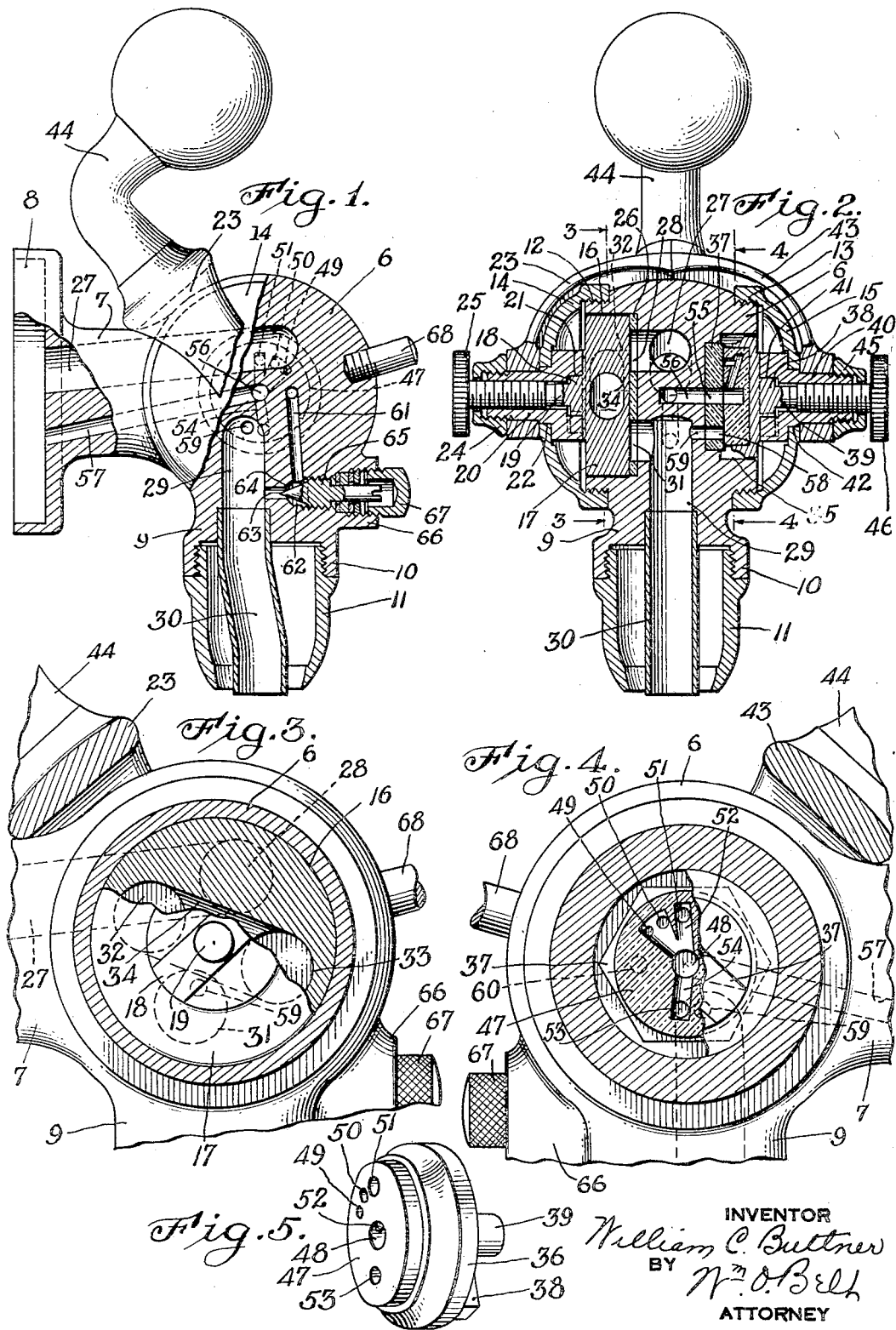
INVENTOR
William C. Buttner
BY Wm. O. Bell
ATTORNEY Patented Oct. 17, 1933

1,930,461

UNITED STATES PATENT OFFICE 1,930,461

FAUCET

William C. Buttner, Chicago, Ill., assignor to
The Bastian-Blessing Company, Chicago, Ill.,
a corporation of Illinois Application October 6, 1932. Serial No. 636,546

8 Claims. (Cl. 225—26)

This invention relates to faucets and more particularly to that kind wherein syrup is intermingled with carbonated water to produce a frothy drink.

It has been the custom in making ice cream sodas to endeavor to cut up the ice cream so as to increase the richness of the liquid and the degree in which this was accomplished has depended upon the skill and thoroughness of the dispenser. It has therefore been proposed to make sodas from a syrup containing not only a flavor but also an equivalent of ice cream and to this end suitable flavoring and condensed milk and other suitable ingredients have been mixed to provide a syrup. When this syrup is churned by being mixed with a fine stream of carbonated water, a rich creamy soda is produced which in itself is a very satisfactory drink but the attractiveness of which may be increased by adding ice cream thereto.

One of the objects of my invention is to provide a novel faucet which is maintained in a sweet and sanitary condition at all times and in which a syrup is intermingled with a fine stream of carbonated water to produce a frothy drink.

The viscosity of a milk syrup, such as that described, is rather high and another object of my invention is to prevent this syrup from so collecting in the faucet that it might tend to drip from the faucet after a dispensing operation.

Further objects are to provide a faucet wherein directly proportionate amounts of syrup and carbonated water are intermixed in each operation; from which a stream of clear carbonated water may be passed; wherein the fine or mixing stream of carbonated water may be expeditiously controlled; and to provide a faucet of simple and efficient operation and economical construction.

A selected embodiment of the invention is illustrated in the accompanying drawing wherein Fig. 1 is a side view partly in elevation and partly in section;

Fig. 2 is a longitudinal sectional view;

Fig. 3 is a transverse view taken substantially on the line 3—3 on Fig. 2;

Fig. 4 is a transverse view taken substantially on the line 4—4 on Fig. 2; and

Fig. 5 is a perspective detail view of the water tumbler.

In the preferred form of construction shown in the accompanying drawing, 6 is a substantially cylindrical body having a neck 7 extending therefrom and terminating in a flanged portion 8 adapted to be connected to a suitable fixture. Another neck 9 extends from the body 6 substantially at right angles to the neck 7 and terminates in a threaded flanged portion 10 having a spout 11 connected thereto. Threads 12 and 13 are provided at opposite ends of the body 6 and caps 14 and 15 are screwed onto these threads.

A recess 16 is provided at one end of the body inwardly of the cap 14 and a tumbler 17 is rotatably mounted in this recess. A diametrically extending truncated rib 18 is provided on the outwardly disposed face of the tumbler and a pin 19 extends outwardly from this rib axially of the tumbler. A connector 20 has a bifurcation 21 at the inner end thereof embracing the rib 18. The connector 20 extends through a central opening 22 in the cap 14 and has a shoulder thereon engaged by the cap and this arrangement retains the connector and tumbler in position. An arm 23 has one end thereof connected to a polygonal portion located outwardly of the cap 14 on the connector 20 and this arm extends over the body 6 and terminates substantially midway in the extent of said body. A nut 24 is screwed onto the end of the connector 20 and retains the arm 23 in position. A thumb screw 25 is passed through an opening in the nut 24 and a threaded axial bore in the connector 20 and the end thereof engages the pin 19. By adjusting the screw 25 the engagement of the inner face of the tumbler 17 with the valve leather 26 at the bottom of the recess 16 is regulated.

A passage 27 extends through the neck 7 into the body 6 and a continuation of this passage extends to a port 28 in the valve leather 26. Another passage 29 is provided in the body 6 and extends through the neck 9. The discharge portion of the faucet is provided by a discharge tube 30 connected at the lower end of the passage 29 and extended through the spout 11. Another passage in the body 6 extends between the inner end of the passage 29 and a port 31 in the valve leather 26. The ports 28 and 31 in the valve leather are located in spaced diametrical relation with each other. Two ports 32 and 33 are provided in the inner face of the tumbler 17 and these ports are connected by a passage 34. The ports 32 and 33 are spaced similarly to the ports 28 and 31 and are adapted to register therewith as will be explained. The syrup flows through the foregoing passages and ports, as is described hereinafter.

A recess 35 is provided at the end of the body opposite the recess 16 and a tumbler 36 is mounted in this recess. A valve leather 37 is disposed at the bottom of the recess and is engaged by the tumbler 36. A diametrically extending rib 38 is provided on the outer face of the tumbler 36 and a pin 39 extends outwardly from this rib axially of the tumbler 36. A connector 40 has a bifurcation 41 at the inner end thereof embracing the rib 38 and this connector extends through an opening 42 in the cap 15 and has a shoulder thereon engaged by the cap to retain the connector and therefore the tumbler 36 in position. A polygonal portion is formed on the connector 40 outwardly of the cap 15 and one end of an arm 43 is mounted on this polygonal portion. The arm 43 extends over the valve body and abuts the end of the arm 23 and these arms include cooperating portions providing a threaded stud onto which the handle 44 is screwed so that upon movement of the handle both these arms are moved simultaneously. A nut 45 is mounted on the end of the connector 40 and retains the arm 43 in position. A thumb screw 46 extends through an opening in the nut 45 and a threaded bore in the connector 40 and engages the pin 39 and by adjustment of the thumb screw the engagement of the tumbler 36 with the valve leather 37 is regulated.

A hard rubber insert 47 is provided on the inner face of the tumbler 36 and has a centrally located port 48 therein. Three spaced ports 49, 50 and 51 of graduated size are provided in the face of the insert 47 adjacent the edge thereof and passages 52 are provided in the insert and interconnect the ports 49, 50 and 51 with the port 48. Another port 53 is provided in the face of the insert 47 in spaced relation with the graduated ports and a passage 54 interconnects this port with the port 48. The port 48 registers with a port 55 in the leather 37 which, in turn, registers with a passage 56 formed in the body 6. A passage 57 extends from the passage 56 through the body 6 and neck 7. A port 58 is provided in the leather 37 and is adapted for registration with the port 54 and a passage 59 interconnects the port 58 and the passage 29. Another port 60 is provided in the leather 37 and this opening is adapted for registration with the ports 49, 50 and 51. A passage 61 in the body 6 interconnects the port 60 with a bore 62. A passage 63 interconnects the bore 62 and the passage 29. A valve seat 64 is provided in the bore 62 and a control valve 65 in the bore 62 cooperates with this valve seat to regulate water flow past said valve seat and through the passage 63. The bore 62 opens through a boss 66 on the body 6 and a cap screw 67 screwed onto this boss closes the outer end of the bore 62 and conceals the control valve 65.

A stop pin 68, adapted for cooperation with handle 44, is provided at the front of the body 6.

In use the flanged portion 8 is connected to a suitable fixture. A syrup tube is connected at the outer end of the passage 27 and the outer end of the passage 57 is connected with a source of carbonated water. When the handle 44 is in the position illustrated in Fig. 1, the faucet is closed and an unapertured portion of the face of the tumbler 17 engages the face of the valve leather 26 and the thumb screw 25 is adjusted to effect such engagement between these parts that leakage thereby is prevented. Likewise, an unapertured portion of the face of the insert 47 engages the valve leather 37 and the thumb screw 36 is adjusted to effect such engagement between these parts that leakage thereby is prevented. Thus, the tumblers and leathers provide valve means controlling the flow of syrup and water through the passage in the faucet. Hence, as the handle 44 is grasped and moved toward the stop pin 68, the various ports in the tumblers and valve leathers move into registration with each other and permit flow of syrup and water through the faucet. The port 58 is so located that immediately following movement of the handle from the position illustrated in Fig. 1, the port 53 in the insert 47 moves into registration therewith and when these ports are in registration water flows from the passage 57 through the passage 56, port 55, port 48, passage 54, port 53, port 58, passage 59 into the passage 29 from whence it flows through the tube 30. During the time the ports 53 and 58 are in registration only clear water is discharged. As movement of the handle toward the stop pin 68 continues and immediately following the movement of the port 53 from registration with the port 58, the port 49 moves into registration with the port 60 and at this same time the ports 32 and 33 start to move into registration with the ports 28 and 31 respectively. It is apparent that at first but a small portion of the ports 32 and 33 register with the ports 28 and 31 and under such conditions only a small quantity of syrup flows from the passage 27 through port 28, port 32, passage 34, port 33 and port 31 into the passage 29. Since the quantity of syrup is rather small due to the restricted registration of the ports, it is desirable that only a small quantity of water be admitted into the passage 29, the water and syrup being intermingled in this passage. Since only a small quantity of water is required at this time the port 49 is of restricted size and consequently only a restricted amount of water flows from the passage 57 through passage 56, port 55, port 48, passage 52, port 49, port 60 and passage 61 into bore 62. The position of the valve 65 relative to the valve seat 64 is such that the flow of water from the bore 62 into passage 63 is restricted and therefore a fine stream of water flows from passage 63 and intermingles with the syrup flowing through the passage 29 and this fine stream tends to churn the syrup and thus a frothy drink is produced which is discharged from the tube 30. As the handle continues to move toward the stop 68, registration of the ports 32 and 33 with the ports 28 and 31 increases and the port 50 moves into registration with the port 60. The port 50 is larger than port 49 and therefore a greater quantity of water flows to the bore 62 and out through the passage 63. Therefore as the quantity of syrup increases, the quantity of water mixed therewith increases so that the relative proportion of syrup and water remains substantially constant. At the time the handle 44 engages the stop pin 68, the ports 32 and 33 are in complete registration with the ports 28 and 31 and at this time the port 51, which is the largest of the series of graduated ports, is in registration with the port 60 and again the flow of water to the bore 62, which is discharged through the passage 63, is proportionate to the quantity of syrup flowing into the passage 29. Obviously, when the handle is moved in the opposite direction so as to gradually decrease the registration of the ports 32 and 33 with the ports 28 and 31 the quantity of water flowing to the bore 62 is proportionately decreased and at the time the ports 32 and 33 entirely move from registration with the ports 28 and 31, the port 49 moves from registration with the port 60.

It has been stated that it is an object of the invention to prevent an accumulation of syrup in the discharge tube from which it might tend to drip after an operation of the faucet. Therefore, following the time the syrup ports move from registration with each other and the series of graduated ports move from registration with the port 60, the port 53 moves into registration with the port 58 and a clear stream of water flows into the passage 29 and flushes out through the passage so that no syrup remains therein which may later drip from the faucet or which may tend to collect therein and create an unsanitary condition. At the time the handle is moved back into the position shown in Fig. 1, the port 53 is out of registration with the port 58 and the faucet is closed.

Since a fine stream of water is intermingled with the syrup in the faucet, a frothy homogeneous drink is dispensed and this is enhanced by maintaining a definite relative proportion between the quantity of syrup and water. Moreover, since the discharge tube of the faucet is flushed out following the dispensing of a drink, it is clear that a sweet and sanitary condition is maintained and that dripping is prevented.

The faucet may also be used to discharge only a stream of carbonated water and when this is desired, the handle 44 is only moved sufficiently to effect registration of the ports 53 and 58 and after the desired quantity of carbonated water has been withdrawn, the handle is returned to faucet closing position illustrated in Fig. 1.

While I have illustrated and described a selected embodiment of my invention it is to be understood that this is capable of variation and modification and I therefore do not wish to be limited to the precise details set forth but desire to avail myself of such changes and alterations as fall within the purview of the following claims.

I claim:

1. In a faucet, a body, a discharge portion in said body, said body having a discontinuous passage therein leading to said discharge portion and terminating in spaced ports, a tumbler having ports therein respectively adapted for communication with the ports in the body and having a passage interconnecting the ports therein, means supporting the tumbler for rotative movement so that the ports therein may be moved into registration with the ports in the body, said body having another discontinuous passage therein leading to said discharge portion and terminating in separated ports, a second tumbler in said body having a series of ports of graduated size adapted for registration with one of the last-named ports in said body and having another port therein in communication with said series of ports and in constant communication with another of said last-named ports in said body, said second tumbler having another port therein in communication with the port in constant communication with the port in said body, said body having a passage leading to said discharge portion and including a port adapted for registration with the last-named port in the second tumbler, and means for rotating said tumblers to move said ports of graduated size successively into registration with the port adapted for communication therewith as the ports in the first-named tumbler move into registration with the ports communicating therewith and to move the last-named port in the second tumbler into registration with the port communicating therewith prior to and subsequent to the registration of the other ports in said tumblers with the ports communicating therewith.

2. In a faucet, a body having a discontinuous passage therein terminating in separated ports, a tumbler having ports therein respectively adapted for communication with the ports in the body and having a passage interconnecting the ports therein, means supporting the tumbler for rotative movement so that the ports therein may be moved into registration with the ports in the body, said body having another discontinuous passage therein terminating in separated ports, another tumbler in said body having a series of ports of graduated size adapted for registration with one of the last-named ports in said body and having another port therein in communication with said series of ports and in constant communication with another of said last-named ports in the body, means supporting said last-named tumbler for rotative movement, and means for rotating said tumblers to move said ports of graduated size successively into registration with the port adapted for communication therewith as the ports in the first tumbler move into registration with the ports communicating therewith.

3. In a faucet, a discharge portion, said faucet having passages therein leading from supplies of syrup and water to said discharge portion wherein the syrup and water are intermingled, and means regulating flow of syrup and water to said discharge portion and including a pair of syrup ports movable relatively into registration and a plurality of water ports of graduated size successively movable into registration, the graduated ports permitting passage of water in a quantity proportionate to the quantity of syrup flowing through the relatively movable ports.

4. In a faucet, a discharge portion, said faucet having passages therein leading from supplies of syrup and water to said discharge portion wherein the syrup and water are intermingled, valve means controlling flow of syrup to said discharge portion and embodying a pair of ports movable relatively into registration, valve means controlling flow of water to said discharge portion and including a plurality of ports of graduated size adapted for successive registration with a cooperating port, and an operating handle for moving said valve means to move ports of increasing size into registration with the cooperating port as the registration of the relatively movable ports increases whereby proportionate amounts of syrup and water are admitted to said discharge portion.

5. In a faucet, a discharge portion, said faucet having a discontinuous syrup passage therein leading from a supply of syrup to said discharge portion, a tumbler having a passage therein and having ports at the ends of said passage adapted for registration with the spaced ends of said discontinuous syrup passage whereby as said ports are registered with the ends of said passages syrup is admitted into said discharge portion, said faucet having a discontinuous water passage therein leading from a supply of water to said discharge portion, another tumbler having a passage therein and a plurality of spaced ports at one end of said passage adapted to successively register with one of the spaced ends of said discontinuous water passage and having another port at the other end of said passage adapted for registration with the other of the spaced ends of said discontinuous water passage, and means for simultaneously moving said tumblers to thereby simultaneously admit syrup and water to said discharge portion, the plurality of spaced ports successively admitting a quantity of water proportionate to the quantity of syrup admitted.

6. In a faucet, a discharge portion, said faucet having a discontinuous syrup passage therein leading from a supply of syrup to said discharge portion, a tumbler having a passage therein and having ports at the ends of said passage adapted for registration with the spaced ends of said discontinuous syrup passage whereby as said ports are registered with the ends of said passages syrup is admitted into said discharge portion, said faucet having a discontinuous water passage therein leading from a supply of water to said discharge portion, another tumbler having a passage therein and a plurality of spaced ports at one end of said passage adapted to successively register with one of the spaced ends of said discontinuous water passage and having another port at the other end of said passage adapted for registration with the other of the spaced ends of said discontinuous water passage, said last-named tumbler having another port therein and communicating with said passage, and means for simultaneously moving said tumblers to thereby simultaneously admit proportionate quantities of syrup and water to said discharge portion, the other port in the second-named tumbler admitting water to said discharge portion prior to and subsequent to the admission of syrup thereto to thereby flush out said discharge portion.

7. In a faucet, a discharge portion, a valve seat, said faucet having a passage therein leading from a supply of syrup and terminating in a port in said valve seat and having another passage therein leading from another port in said valve seat to said discharge portion, a tumbler having a passage therein and having the ports at the ends of said passage adapted for registration with the ports in said valve seat, another valve seat in said passage, said faucet having another passage therein leading from a water supply to a port in the second-named valve seat and having still another passage therein leading from another port in said second valve seat to said discharge portion, a second tumbler in said faucet and having a passage therein and a plurality of spaced ports of graduated size at one end of said passage and another port at the other end of said passage, and means for simultaneously moving said tumblers to thereby simultaneously admit syrup and water to said discharge portion, the plurality of ports of graduated size successively admitting a quantity of water proportionate to the quantity of syrup admitted.

8. In a faucet, a discharge portion, a valve seat, said faucet having a passage therein leading from a supply of syrup and terminating in a port in said valve seat and having another passage therein leading from another port in said valve seat to said discharge portion, a tumbler having a passage therein and having the ports at the ends of said passage adapted for registration with the ports in said valve seat, another valve seat in said passage, said faucet having another passage therein leading from a water supply to a port in the second-named valve seat and having still another passage therein leading from another port in said second valve seat to said discharge portion, a second tumbler in said faucet and having a passage therein and a plurality of spaced ports of graduated size at one end of said passage and another port at the other end of said passage, said last-named tumbler having another port therein and communicating with said passage, and means for simultaneously moving said tumblers to thereby simultaneously admit proportionate quantities of syrup and water to said discharge portion, the other port in the second-named tumbler admitting water to said discharge portion prior to and subsequent to the admission of syrup thereto to thereby flush out said discharge portion.

WILLIAM C. BUTTNER.